A. W. SPRENGER & O. A. BREMER.
CONNECTING ROD BABBITTING DEVICE.
APPLICATION FILED MAY 6, 1918.
1,294,558.
Patented Feb. 18, 1919.
2 SHEETS—SHEET 1.
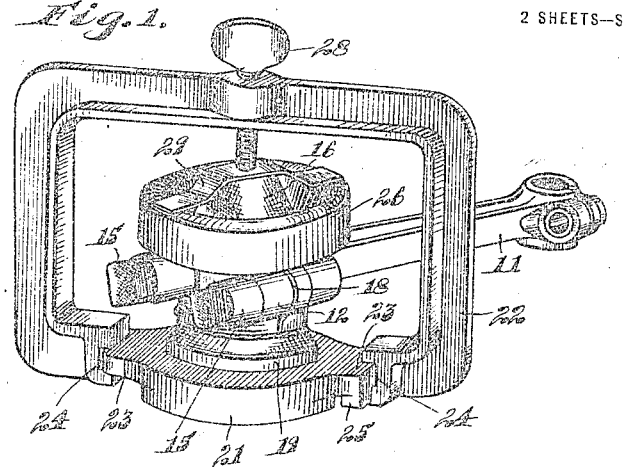
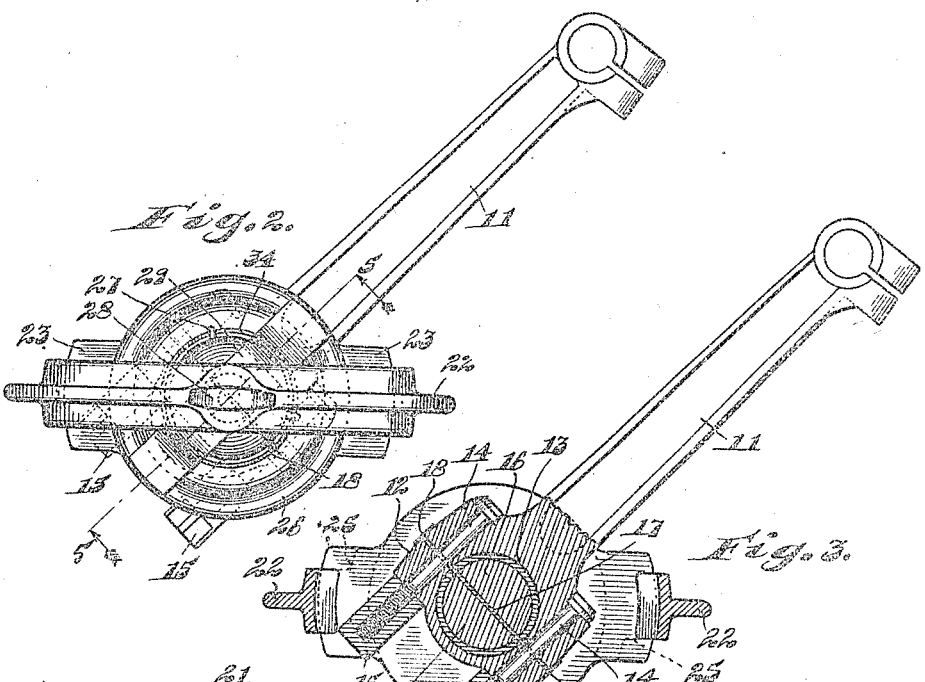
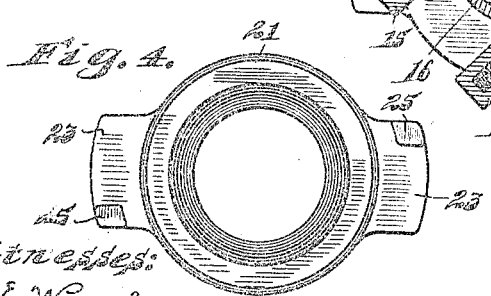
Witnesses:
C. E. Wesely
R. A. Olin
Inventors.
Alfred W. Sprenger,
Otto A. Bremer,
By Joshua R. H. Potts
Their Attorney

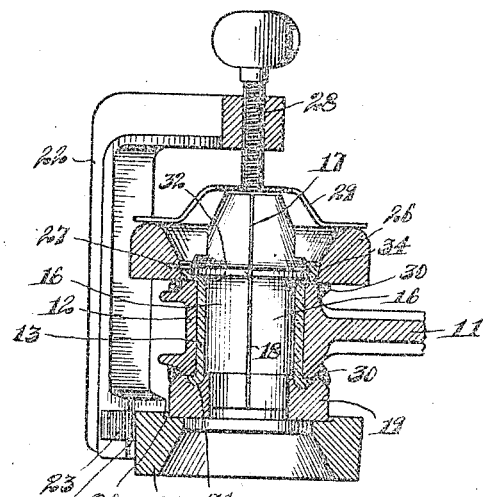

UNITED STATES PATENT OFFICE.

ALFRED W. SPRENGER AND OTTO A. BREMER, OF BURLINGTON, IOWA.

CONNECTING-ROD-BABBITTING DEVICE.

1,294,558.   Specification of Letters Patent.   Patented Feb. 18, 1919.

Application filed May 6, 1918. Serial No. 232,786.

*To all whom it may concern:*

Be it known that we, ALFRED W. SPRENGER and OTTO A. BREMER, citizens of the United States, and residents of the city of Burlington, county of Des Moines, and State of Iowa, have invented certain new and useful Improvements in Connecting-Rod-Babbitting Devices, of which the following is a specification.

Our invention relates to improvements in babbitting devices designed for use especially in connection with the connecting rods of automobile engines, and has for its object the production of a device of this character through the medium of which a connecting rod or the like may be babbitted or rebabbitted with ease and expedition by one, whether experienced or not in work of this nature.

A further object is the production of a device as mentioned, which will be of durable and economical construction, and whereby an automobile owner may, himself, with little trouble and with practically no loss of time, effect the rebabbitting of his connecting rods when necessary.

Other objects will appear hereinafter.

The invention consists in the combinations and arrangements of parts hereinafter described and claimed.

The invention will be best understood by reference to the accompanying drawings forming a part of this specification, and in which, Figure 1, is a perspective view of a babbitting device embodying the invention, Fig. 2, a top plan view thereof, Fig. 3, a horizontal section through the device as seen in Figs. 1 and 2, Fig. 4, a bottom plan view of the lower base member included in the construction, Fig. 5, a section taken on substantially line 5—5 of Fig. 2, Fig. 6, a section illustrating the method of detachment of the pouring funnel of the device after the pouring of the babbitt has taken place, Fig. 7, a side elevation of the mandrel employed in the construction, Fig. 8, a section taken on line 8—8 of Fig. 7, Fig. 9, a top plan view of the pouring funnel, and Fig. 10, a top plan view of the lower closure used in connection with the device.

The preferred form of construction, as illustrated in the drawings, is designed for use especially in the babbitting of connecting rods of the type consisting of a body 11 and a detachable end piece 12, the opening 13 to be babbitted being located centrally between the parts 11 and 12. Said parts 11 and 12 are detachably connected by bolts 14 and coöperating nuts 15.

The babbitting device forming the subject matter of this application comprises a mandrel consisting of two similar parts 16, each semi-cylindrical in form, the parts 16 being of such size that if the same were to be assembled in contact with each other, a complete cylinder would be formed of a diameter the same as that of the shaft or other device with which the connecting rod is adapted to engage when in use. The parts 16 of the mandrel are, however, separated slightly by a plate 17, the parts 16 and 17 being rigidly secured together by screws or other suitable fastening devices. The plate 17 projects laterally from the members 16 forming leaves or ears 18, which are adapted to engage between the parts 11 and 12 of the connecting rod in the babbitting operation, said leaves 18 being perforated for engagement with the bolts 14.

The lower end portion of the mandrel is of a diameter less than that of the opening 13, so that when the mandrel is arranged in said opening, an annular space will be formed around the mandrel, as clearly seen in Fig. 3. Said mandrel will be held in central position in said opening by the bolts 14.

The lower reduced end portion of the mandrel is adapted to engage an annular closure member 19 with the under side of the connecting rod resting upon the upper side of the member 19, as clearly seen in Fig. 5. The member 19 thus serves to close the annular space in the connecting rod around the mandrel.

The member 19 rests loosely in a seat 20 provided at the upper side of a base member 21, which is removably mounted in a supporting frame-work or clamp 22. To effect detachable connection between the member 21 and the frame 22, said member is formed with laterally projecting lugs 23, adapted to loosely engage with inwardly facing notches or channels 24 formed in the lower ends of the frame 22. Engagement of the member 21 with the channels 24 is effected by rotating the member 21 in a counterclockwise direction, such rotation being limited by stops 25 formed at the under sides of lugs 23.

Provided for engagement with the upper side of the connecting rod is a pouring funnel 26, having inwardly projecting pins 27 which are adapted to engage with the enlarged upper end portion of the mandrel to hold said pouring funnel centrally with reference thereto. The pouring funnel is pressed into operative relation with the connecting rod by means of a screw 28 threaded centrally in the upper portion of frame 22, the inner end of said screw carrying a resilient cross-piece 29 adapted to engage with the upper side of said pouring funnel, as clearly seen in Fig. 5. Said screw and spring, when thus engaged, are adapted to securely hold the parts in operative relation with each other, as seen in Fig. 5.

With the construction set forth then, it will be seen that in the babbitting operation it is only necessary to separate the parts of the connecting rod, and, where it is a job of rebabbitting, to chip out or otherwise remove the old babbitting. It is desirable next to tin the inner surfaces of the connecting rod or to drill holes in the same, in order to anchor the metal therein. The parts are then preferably washed with gasolene. This having been done, the mandrel is inserted between the parts of the connecting rod and securely fastened in position by the bolts 14 and nuts 15, as above described. The part 19 is then placed on the base member 21 and the lower reduced end of the mandrel inserted into the opening in member 19. The pouring funnel 26 is then placed over the upper end of the mandrel and brought to rest upon the upper side or edge of the connecting rod.

The parts as now assembled, are preferably heated in a gas stove flame, or with a gasolene blow torch to insure easy flowing of the molten Babbitt metal and to prevent chilling of the metal before the narrow space between the mandrel and inside of the rod is filled up.

The frame 22 is now arranged in operative relation with the base member 21, by turning said frame member in a clockwise direction until the same engages with the stops 25. The parts are then securely clamped together through manipulation of the thumb screw 28. To insure against leakage through the joints between the rod and the parts 19 and 26, two or three turns of cord as seen at 30 are preferably provided at these points, as clearly seen in Fig. 4. Cord is preferably used for this purpose, although fire clay or other suitable sealing material may be employed if desired.

The metal in a molten condition is then poured rapidly into the pouring funnel at either side of the rod directly above the partition member 17, the metal being poured at this place in order to insure a like amount of metal entering both sides of the rod at the same time.

The upper side of the member 19 is formed with an annular groove 31, and the upper end portion of the mandrel is enlarged and formed with a curved shoulder 32 in order to effect the flowing of the metal over the ends of the connecting rod journal or bearing, as clearly seen in Fig. 5.

When the metal has become hard, the frame 22 is removed from the base member 21, and the latter and lower closure member 19 are removed from the connecting rod, as well as the cord or sealing material 30. The pouring funnel 26 is then placed upon two supports 33, as for instance the jaws of a vise, as seen in Fig. 6, with the lower flat side of the funnel resting upon the upper sides of the members 33, whereupon the upper end of the mandrel is struck a sharp blow with a hammer or the like, to separate the metal forming the bearing from the surplus metal in the pouring funnel. In order to facilitate the severing of this surplus metal from the metal forming the bearing, the pouring funnel is formed with an annular internal shoulder 34, which is positioned in a plane below the annular shoulder 32 of the mandrel, so that when the upper end of the mandrel is struck a sharp blow as mentioned, shoulders 32 and 34 will coöperate in effecting a sort of shearing action which will insure a comparatively clean-cut around the upper edge of the connecting rod.

After this has been done, the nuts and bolts are removed and the parts of the connecting rod separated by simply lightly tapping the same with a hammer, the mandrel being separated at the same time. The sharp corners of the babbitting metal at the inside of the joint of the rod are then chamfered off and the rod is ready to assemble on the crank shaft of the motor without any additional scraping or fitting. The mandrel being of just the right diameter, the bearing, when assembled, will be just the right size for the crank shaft engaged thereby.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:—

1. The combination with a connecting rod or the like, having an opening therethrough, said rod being divided at said opening into two parts and there being securing devices connecting said parts, of means for babbitting said opening, comprising a mandrel of less diameter than said opening and adapted to be inserted thereinto; laterally projecting leaves on said mandrel, interposed between said parts and having openings engaged by said securing devices for holding said mandrel central in said opening to form a space around said mandrel; means for closing one end of said space; and means for directing the supply of molten metal into said space, substantially as described.

2. The combination with a connecting rod or the like, having an opening therethrough, said rod being divided at said opening into two parts and there being securing devices connecting said parts, of means for babbitting said opening comprising a mandrel of less diameter than said opening and adapted to be inserted thereinto; means for holding said mandrel central in said opening to form a space around said mandrel; a member for closing the lower end of said space; a funnel for guiding the molten metal into the upper end of said space; means for holding said member and funnel in operative relation with the connecting rod, comprising a support for one of said elements; and means coöperating with said support for pressing the other element into operative position, substantially as described.

3. The combination with a connecting rod or the like, having an opening therethrough, said rod being divided at said opening into two parts, and there being securing devices connecting said parts, of means for babbitting said opening, comprising a mandrel of less diameter than said opening and adapted to be inserted thereinto; means for holding said mandrel central in said opening, to form a space around said mandrel; a member for closing the lower end of said space; a funnel for guiding the molten metal into the upper end of said space; means for holding said member and funnel in operative relation with the connecting rod, comprising a support for one of said elements; and a screw threaded into said support for pressing the other element into operative position, substantially as described.

4. The combination with a connecting rod or the like having an opening therethrough, said rod being divided at said opening into two parts and there being securing devices connecting said parts, of means for babbitting said opening comprising a mandrel of less diameter than said opening and adapted to be inserted thereinto; means for holding said mandrel central in said opening to form a space around said mandrel; a member for closing the lower end of said space; a funnel for guiding the molten metal into the upper end of said space; means for holding said member and funnel in operative relation with the connecting rod, comprising a support for one of said elements; and a screw threaded into said support carrying a resilient cross-piece at its inner end engaging with the other element for pressing the latter into operative position, substantially as described.

5. The combination with a connecting rod or the like having an opening therethrough, said rod being divided at said opening into two parts, and there being securing devices connecting said parts, of means for babbitting said opening comprising a mandrel of less diameter than said opening and adapted to be inserted thereinto; means for holding said mandrel central in said opening, to form a space around said mandrel; a pouring funnel for guiding the molten metal into said space; and opposing shearing edges on said mandrel and funnel to facilitate severing of the surplus metal in said funnel, when cooled, from the metal forming the babbitting in the connecting rod, substantially as described.

6. The combination with a connecting rod or the like having an opening therethrough, said rod being divided at said opening into two parts, and there being securing devices connecting said parts, of means for babbitting said opening comprising a mandrel of less diameter than said opening and adapted to be inserted thereinto; means for holding said mandrel central in said opening, to form a space around said mandrel; a pouring funnel for guiding the molten metal into said space; and opposing annular shearing shoulders on said mandrel and funnel to facilitate severing of the surplus metal in said funnel, when cooled, from the metal forming the babbitting in the connecting rod, substantially as described.

7. The combination with a connecting rod or the like having an opening therethrough, said rod being divided at said opening into two parts, and there being securing devices connecting said parts, of means for babbitting said opening, comprising a mandrel of less diameter than said opening and adapted to be inserted thereinto; means for holding said mandrel central in said opening, to form a space around said mandrel; a funnel engaging loosely with the upper side of the connecting rod, for guiding the molten metal into said space; and means for holding said funnel central with reference to said mandrel, said means comprising inwardly extending projections on said funnel engaging at their inner ends with the outer side of the mandrel, the outer side of said mandrel engaged by said projections being conically formed, substantially as described.

8. The combination with a connecting rod or the like, having an opening therethrough, said rod being divided at said opening into two parts and there being securing devices connecting said parts, of means for babbitting said opening comprising a mandrel of less diameter than said opening and adapted to be inserted thereinto; means for holding said mandrel central in said opening to form a space around said mandrel; a member arranged to coöperate with said mandrel at one end of said space; and opposing shearing edges on said mandrel and member to facilitate severing of the surplus metal in said member, when cooled, from the metal forming the babbitting in the connecting rod, substantially as described.

In testimony whereof we have signed our names to this specification in the presence of two subscribing witnesses.

ALFRED W. SPRENGER.
OTTO A. BREMER.

Witnesses:
  J. BECKMAN,
  C. F. BUHMASTER.